United States Patent
Rice et al.

(10) Patent No.: US 10,113,636 B2
(45) Date of Patent: Oct. 30, 2018

(54) POWER ACTUATOR WITH INTEGRAL DECOUPLING MECHANISM

(71) Applicants: John R. Rice, New Baltimore, MI (US); Ian J. Dow, Bloomfield, MI (US); Donald M. Perkins, Sterling Heights, MI (US)

(72) Inventors: John R. Rice, New Baltimore, MI (US); Ian J. Dow, Bloomfield, MI (US); Donald M. Perkins, Sterling Heights, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 399 days.

(21) Appl. No.: 14/935,080

(22) Filed: Nov. 6, 2015

(65) Prior Publication Data

US 2016/0061316 A1     Mar. 3, 2016

Related U.S. Application Data

(62) Division of application No. 13/862,074, filed on Apr. 12, 2013, now abandoned.

(Continued)

(51) Int. Cl.
*F16H 59/10* (2006.01)
*G05G 1/04* (2006.01)
(Continued)

(52) U.S. Cl.
CPC ........... *F16H 59/105* (2013.01); *F16D 11/10* (2013.01); *F16D 23/12* (2013.01); *F16H 59/044* (2013.01); *F16H 59/10* (2013.01); *F16H 61/32* (2013.01); *G05G 1/04* (2013.01); *F16D 2023/123* (2013.01); *F16H 2061/226* (2013.01); *F16H 2061/326* (2013.01); *Y10T 74/18128* (2015.01); *Y10T 74/20396* (2015.01)

(58) Field of Classification Search
CPC ........ F16H 59/105; F16H 11/10; F16H 23/12; F16H 59/044; F16H 61/32
See application file for complete search history.

(56) References Cited

U.S. PATENT DOCUMENTS

| 2,237,749 A | 4/1941 | Simon |
| 2,508,577 A | 5/1950 | Maeser |

(Continued)

FOREIGN PATENT DOCUMENTS

| DE | 4026573 A1 | 3/1991 |
| GB | 2283061 A | 4/1995 |

OTHER PUBLICATIONS

Development of "Electric Actuator for Shift-by-wire" (NTN Corporation); 2 pages.

(Continued)

*Primary Examiner* — David M Fenstermacher
(74) *Attorney, Agent, or Firm* — Cantor Colburn LLP (57) ABSTRACT

A device and method for manually controlling a system including a first lever movable between multiple positions and a movable component. The method including: activating a manual engagement device; engaging a manual control to couple a first lever and a movable component; disengaging an automatic control coupling the first lever and the movable component; and moving the movable component by moving the first lever.

6 Claims, 8 Drawing Sheets

Related U.S. Application Data (60) Provisional application No. 61/625,179, filed on Apr. 17, 2012, provisional application No. 61/769,386, filed on Feb. 26, 2013, provisional application No. 61/769,388, filed on Feb. 26, 2013.

(51) Int. Cl.
| | |
|---|---|
| *F16H 59/04* | (2006.01) |
| *F16H 61/32* | (2006.01) |
| *F16D 11/10* | (2006.01) |
| *F16D 23/12* | (2006.01) |
| *F16H 61/22* | (2006.01) |

(56) References Cited

U.S. PATENT DOCUMENTS

| | | | |
|---|---|---|---|
| 2,621,543 A | 12/1952 | Rossmann | |
| 2,645,835 A | 7/1953 | Bennett et al. | |
| 2,652,932 A | 9/1953 | Funnell | |
| 2,663,956 A | 12/1953 | Simpson, Jr. et al. | |
| 2,950,543 A | 8/1960 | Ritter et al. | |
| 3,033,531 A | 5/1962 | Patterson, III et al. | |
| 3,040,998 A | 6/1962 | Rogers | |
| 3,301,366 A | 1/1967 | Steinberg | |
| 3,545,292 A | 12/1970 | Smith et al. | |
| 4,838,485 A | 6/1989 | Rinkewich | |
| 4,892,014 A | 1/1990 | Morell et al. | |
| 5,035,158 A | 7/1991 | Leigh-Monstevens | |
| 5,094,115 A | 3/1992 | Michihira et al. | |
| 5,448,027 A | 9/1995 | Hoffman et al. | |
| 5,588,330 A | 12/1996 | Kataumi et al. | |
| 5,769,493 A | 6/1998 | Pejathaya | |
| 6,016,717 A | 1/2000 | Wheeler | |
| 6,196,078 B1 | 3/2001 | Dejonge et al. | |
| 6,244,127 B1 * | 6/2001 | Benda | F16C 1/10 74/473.12 |
| 6,295,887 B1 | 10/2001 | Dejonge et al. | |
| 6,487,883 B2 * | 12/2002 | Suzuki | B60R 25/02144 477/99 |
| 6,629,473 B2 | 10/2003 | Syamoto et al. | |
| 6,662,924 B2 | 12/2003 | Giefer et al. | |
| 6,732,847 B1 | 5/2004 | Wang | |
| 6,851,538 B2 | 2/2005 | Meyer et al. | |
| 6,877,390 B2 * | 4/2005 | Tsuzuki | F16H 59/08 74/335 |
| 6,918,314 B2 | 7/2005 | Wang | |
| 6,951,528 B2 | 10/2005 | Ewinger et al. | |
| 7,210,370 B2 | 5/2007 | Giefer et al. | |
| 7,241,244 B2 | 7/2007 | Wang | |
| 7,354,372 B2 | 4/2008 | Wang | |
| 7,393,304 B2 | 7/2008 | Wilde et al. | |
| 7,469,614 B2 | 12/2008 | Wang | |
| 7,597,022 B2 | 10/2009 | Wang | |
| 7,597,023 B2 | 10/2009 | Kortge et al. | |
| 7,921,746 B2 * | 4/2011 | Giefer | F16H 61/22 74/473.21 |
| 8,327,732 B2 | 12/2012 | Giefer et al. | |
| 8,464,601 B2 * | 6/2013 | Giefer | F16H 59/10 74/473.12 |
| 8,534,151 B2 | 9/2013 | Johnson et al. | |
| 8,540,341 B2 | 9/2013 | Yamamoto | |
| 8,607,657 B2 | 12/2013 | Haevescher | |
| 8,656,802 B2 | 2/2014 | Behounek et al. | |
| 8,788,158 B2 | 7/2014 | Kim | |
| 9,518,650 B2 * | 12/2016 | Rake | F16H 59/08 |
| 2002/0134185 A1 | 9/2002 | Tsuzuki et al. | |
| 2002/0162699 A1 * | 11/2002 | Shiomi | F16H 59/105 180/315 |
| 2002/0170376 A1 | 11/2002 | Giefer et al. | |
| 2003/0172757 A1 * | 9/2003 | Yone | F16H 59/0204 74/335 |
| 2003/0221499 A1 | 12/2003 | Wong | |
| 2006/0081085 A1 * | 4/2006 | Otsuka | F16H 59/10 74/473.21 |
| 2006/0137829 A1 * | 6/2006 | Tran | B60C 25/02 157/1.17 |
| 2008/0302628 A1 | 12/2008 | Kimura et al. | |
| 2010/0250055 A1 | 9/2010 | Ito et al. | |
| 2012/0067155 A1 * | 3/2012 | Grosse Kohorst | F16H 59/0204 74/473.15 |
| 2013/0269467 A1 | 10/2013 | Rice | |
| 2014/0174215 A1 | 6/2014 | Dow et al. | |
| 2014/0238161 A1 | 8/2014 | Dow | |

OTHER PUBLICATIONS

English Abstract for DE4026573A1—Mar. 14, 1991; 1 pg.
English Translation to GB2283061 Abstract.
MCS (Mobile Control Systems SA); Shift-By-Wire Controls for Automatic Transmissions; 2 pages.
Transmission Diges; Shift by Wire; Author: Wayne Colonna; pp. 52-56.

* cited by examiner

POWER ACTUATOR WITH INTEGRAL DECOUPLING MECHANISM

CROSS REFERENCE TO RELATED APPLICATIONS

This application is a divisional application of U.S. patent application Ser. No. 13/862,074 filed Apr. 12, 2013, which claims the benefit of U.S. Provisional Patent Application No. 61/625,179, filed Apr. 17, 2012; U.S. Provisional Patent Application No. 61/769,386, filed Feb. 26, 2013; and U.S. Provisional Patent Application No. 61/769,388, filed Feb. 26, 2013, the entire contents of each of which are incorporated herein by reference thereto.

TECHNICAL FIELD

Exemplary embodiments of the present invention relate to a control mechanism and, more particularly, to a manual override system for an electronically controlled linkage or apparatus.

BACKGROUND

Vehicles provide a number of controls allowing the driver of the vehicle to control various functions of the vehicle during operation. One control that is typically provided is a gearshift for the transmission. Automatic transmissions are a common type of transmission because it simplifies shifting of the gear speeds. Automatic transmissions include a limited number of control selections such as park, reverse, neutral and drive. This makes driving the vehicle much easier because the driver chooses a single selection and the transmission automatically shifts the various transmission gears based on the speed of the vehicle and the torque of the load.

Several different types of gearshifts are generally available for vehicles. In the case of automatic transmissions, a shift lever is generally provided which the driver operates by moving the shift lever in a pattern. Desirably, the shift lever should be located at a convenient place near the driver for easy operation, for example the shifting lever may be mounted to the vehicle's steering column or center console.

In various automatic transmissions, the shift lever of the gear shift is not mechanically connected to the transmission cable. Rather, a sensor determines the movement of the shift lever between the various operating modes and sends a signal to a motor mechanically coupled to the transmission cable. If this sensor fails, or the motor fails or the system loses power, the driver of the vehicle will be able to move the shift lever between the various operating modes, but the transmission cable will not respond.

Accordingly, while existing gear shift mechanisms are suitable, the need for improvement remains, particularly in providing an alternate apparatus and method for coupling the shift lever to the transmission.

SUMMARY OF THE INVENTION

According to an exemplary embodiment of the present invention, a system is provided including a first lever movable between multiple positions and a movable component. The system also includes an automatic control and a manual control for coupling the first lever to the movable component. A manual engagement device is movable between an activated position and a deactivated position. When the manual engagement device is activated, the manual control couples the first lever to the movable component, and when the manual engagement device is deactivated, the automatic control couples the first lever to the movable component.

In another embodiment of the invention, a method for manually controlling a system is provided including activating a manual engagement device. A manual control is then engaged to couple a first lever and a movable component. An automatic control coupling the first lever and the movable component is disengaged. The movable component is then moved by moving the first lever.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Referring to the FIGS., a driver operated shifting medium or actuator 20 is illustrated. A gearshift 22 is adapted for mounting in a vehicle having an automatic transmission. The gearshift 22 includes a shift lever 26 having an upper grip portion 24 for the driver's hand. The shift lever 26 extends within and is coupled to the gearshift body 27. The shift lever 26 is pivotally mounted to the gearshift body 27 with a pin to define a pivot axis. The shift lever 26 is moveable through a range of motion about the pivot axis to shift the shifting medium 20 between a plurality of operating modes such as park, reverse, neutral, drive and low. A sensor, illustrated by dotted lines, is also located within the gearshift body 27 and senses the position of the shift lever. The sensor provides a signal to a motor 38 via a microcontroller MC, to move a connected transmission cable or other equivalent device 40 to a position corresponding to the operating mode of the shift lever 26. The transmission cable 40 being operatively coupled to a transmission or other applicable device 41 such that movement of the cable 40 shifts the transmission 41 or actuates a device 41 which causes the shifting of the transmission.

A first end of a connecting lever 30 is fastened to the shift lever 26 about pin 28 and extends vertically downward from the base of the gearshift body 27. A first end of a manual engagement lever 34 is pivotally coupled to a second end 32 of the connecting lever 30 for movement between a first position and a second position. In one embodiment, a spring, such as a torsion spring for example, surrounds the pin (not shown) coupling the manual engagement lever 34 to the connecting lever 30 and biases the manual engagement lever 34 in the direction indicated by arrow A to a first, unengaged position. The manual engagement lever 34 has a throat 36 proximate to a second, opposite end for capturing a pin 46.

Figure 2:
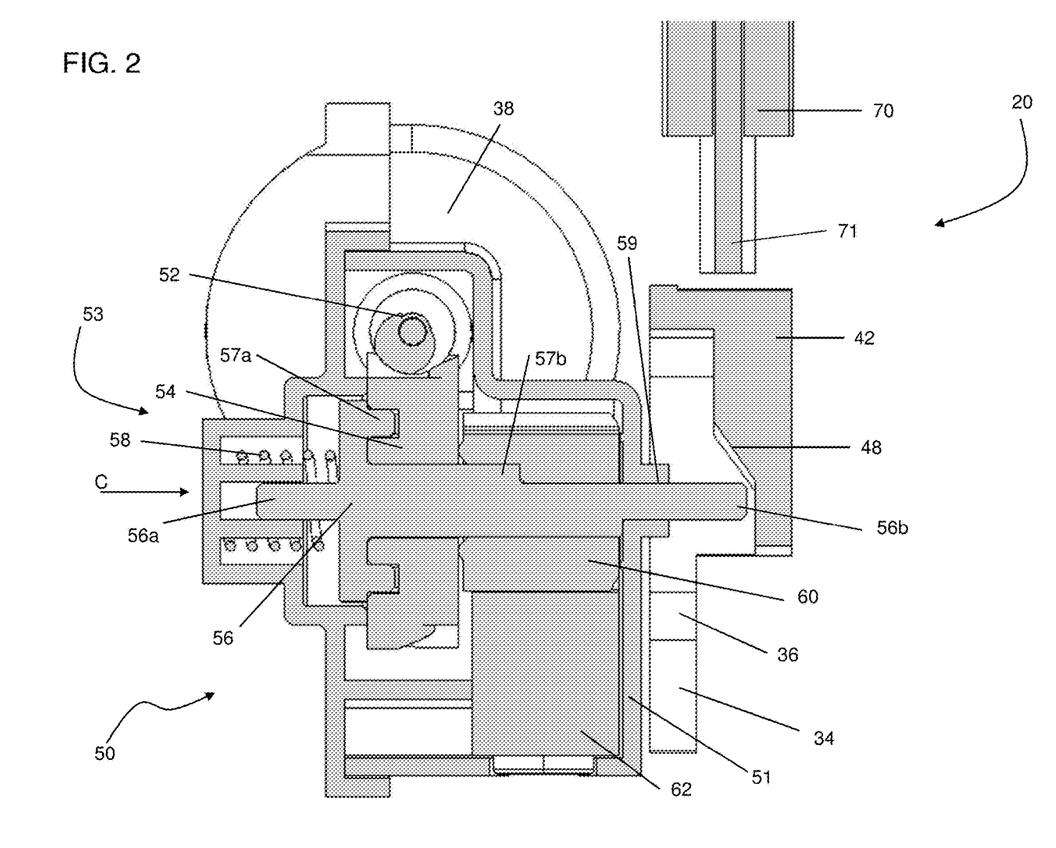
FIG. 2 is a cross-sectional view of the exemplary automatic transmission shifter assembly.

Positioned adjacent the connecting lever 30 and the manual engagement lever 34 is housing 50. A wall 51 of the housing 50, closest to the manual engagement lever 34, includes an elongated opening 47 positioned adjacent the manual engagement lever 34. A manual engagement link 42 is pivotally coupled by a pin 44 to the surface of wall 51 adjacent the manual engagement lever 34. The manual engagement link 42 is biased in the direction of arrow B, such as by a coil spring for example, into a first position out of contact with the manual engagement lever 34. The manual engagement link 42 may be rotated about pin 44 to a second position where the manual engagement link 42 applies a rotational force to the second end of the manual engagement lever 34. When in the second position, the manual engagement link 42 extends from pin 44 generally to the far end of elongated opening 47. The surface of the manual engagement link 42 facing the housing 50 includes a cam surface 48 (see FIG. 2).

Figure 1:
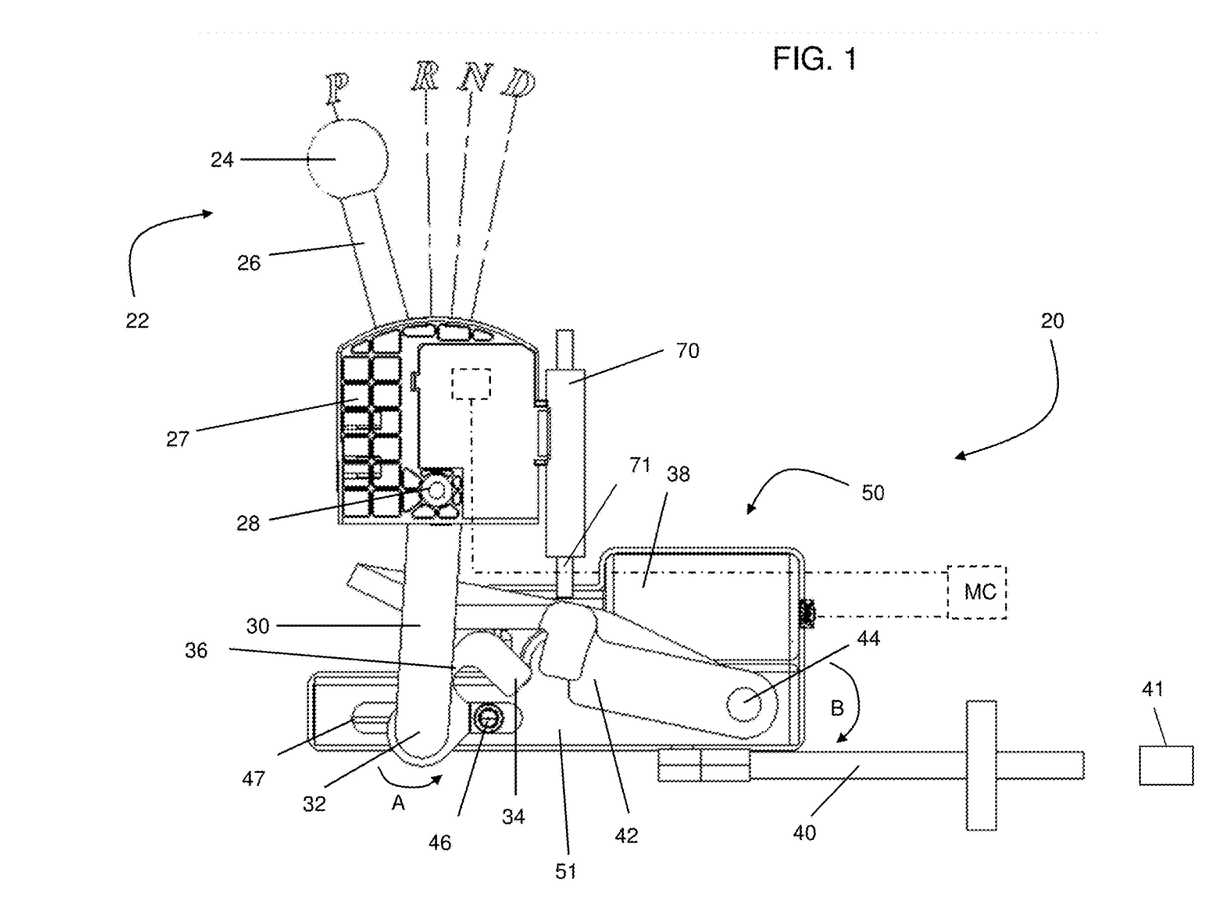
FIG. 1 is a side view of an exemplary automatic transmission shifter assembly according to one embodiment of the invention.
Figure 1A:
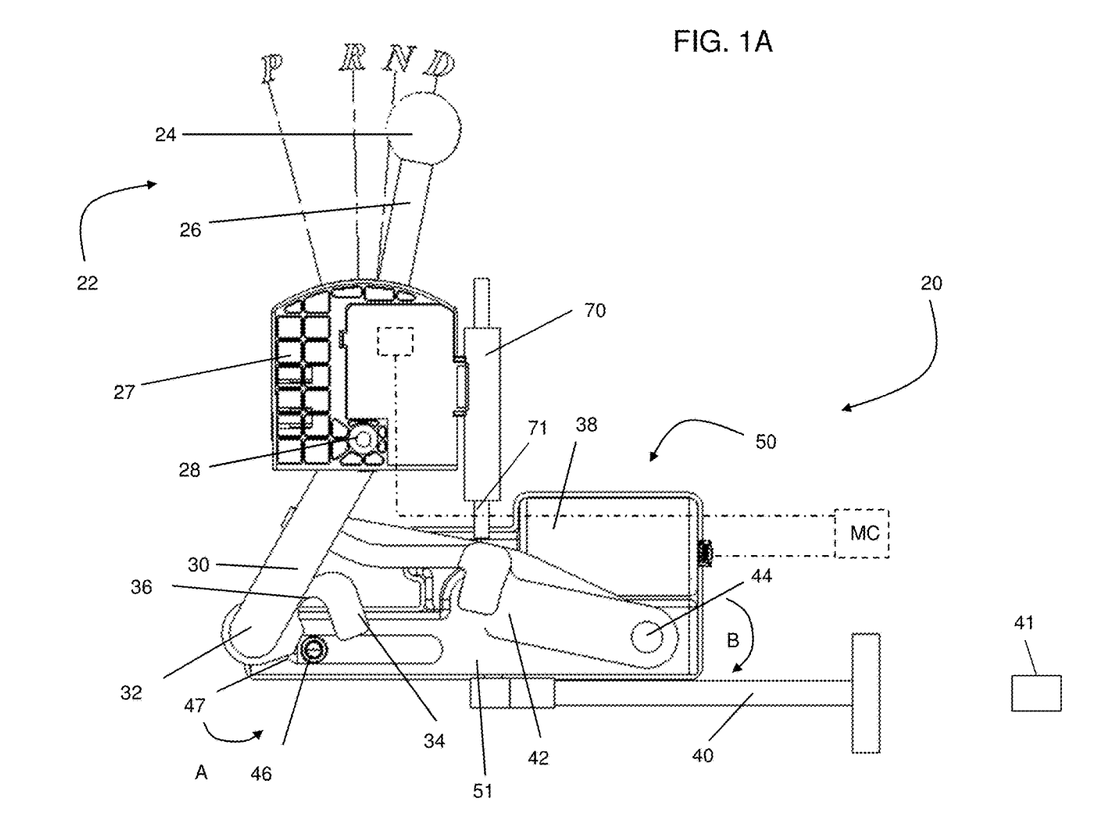
FIG. 1A is a side view illustrating movement of the exemplary automatic transmission shifter assembly.

Disposed within the housing 50 are a motor 38, a coupling mechanism 53, and a movable component 62, such as a rack for example. Located at the end of the housing 50, furthest from the connecting lever 30, is a motor 38 (see FIG. 1) that receives an input signal from the sensor located within the gearshift body 27. The movable component 62 is positioned at the base on the housing 50 adjacent wall 51, closest to the manual engagement lever 34. A pin 46 (see FIG. 1) extends generally horizontally from a side of the movable component 62 in the direction of the manual engagement lever 34 through the elongated opening 47 in wall 51. A second pin (not shown), connected to the transmission cable 40, extends vertically downward from the base of the movable component 62 through an opening (not shown) in the base of the housing 50.

A coupling mechanism 53 mechanically connects the motor 38 to the movable component 62 to move the transmission cable 40 to a position corresponding to the operating mode of the shift lever 26. The input signal from the sensor causes the motor 38 to operate for a certain time, such that the movable component 62, and therefore the transmission cable 40, moves into a position corresponding to the position and operating mode of the shift lever 26. The coupling mechanism 53 includes a plurality of gears, a clutch member 56, and a clutch spring 58. A first gear 52, such as a worm gear for example, is connected to the motor 38 and engages a second gear 54, such as a helical gear for example. A third gear or pinion 60 is disposed adjacent the second gear 54 and engages the movable component or rack 62. In one embodiment, the movable component is a rack that includes a plurality of teeth configured to engage teeth of a pinion gear 60. The second and third gears 54, 60 are rotatably supported on a clutch member 56. The clutch member 56 has shoulders 57a and 57b to engage each of the second and third gears 54, 60 respectively to couple their rotation. If the shoulders 57a, 57b of the clutch member 56 are engaged with the second and third gears 54, 60, activation of the motor 38 will cause the clutch member 56 to spin in unison with the second gear 54. This rotation will be imparted to the third gear 60 causing the rack 62, and the coupled transmission cable 40, to move linearly along the base of housing 50. If the shoulders 57a, 57b of clutch member 56 are not engaged with the second and third gears 54, 60 when the motor 38 is driven, the first and second gears 52, 54 will rotate, but the clutch member 56, the third gear 60, and consequently the movable component 62 will remain stationary.

A first end of the clutch member 56a, closest to the second gear 54, is surrounded by a spring 58 which biases the clutch member 56 in the direction illustrated by arrow C, into an engaged or coupled position. The second end 56b of the clutch member 56 extends through an opening 59 in wall 51 adjacent the cam surface 48 of manual engagement link 42. If the manual engagement link 42 is rotated about pin 44, in a direction opposite the direction indicated by arrow B, the end 56b of the clutch member 56 will contact the cam surface 48, causing the clutch member 56 to slide out of engagement with the second and third gears 54, 60.

Disposed in a position easily accessible by the driver, generally adjacent the gear shift body 27 and above the manual engagement link 42, is a manual engagement device 70 movable between an activated and a deactivated position. In an exemplary embodiment, the manual engagement device 70 is activated by applying a force, such as to a depressible button for example. Additionally, the manual engagement device 70 may be activated and deactivated in a similar manner. For example, by pressing the manual engagement device 70 a first time, the manual engagement device 70 will be activated such that the manual control will be engaged and the automatic control will be disengaged allowing manual control of the shifting medium 20. In other words movement of the shift lever 26 will cause movement of the cable 40 due to a direct mechanical coupling as opposed to the movement of shift lever 26 is a power operated mode wherein the motor 38 is activated according to movement of the shift lever and the cable 40 is manipulated of actuated via its operational engagement with motor 38. In one non-limiting embodiment and if the manual engagement device 70 is pressed a second time, the device 70 is deactivated and automatic control of the shifting medium 20 is resumed. In one non-limiting embodiment, the manual engagement device 70 includes a plunger 71 that contacts the manual engagement link 42 when the manual engagement device 70 is pressed or actuated.

Figure 3:
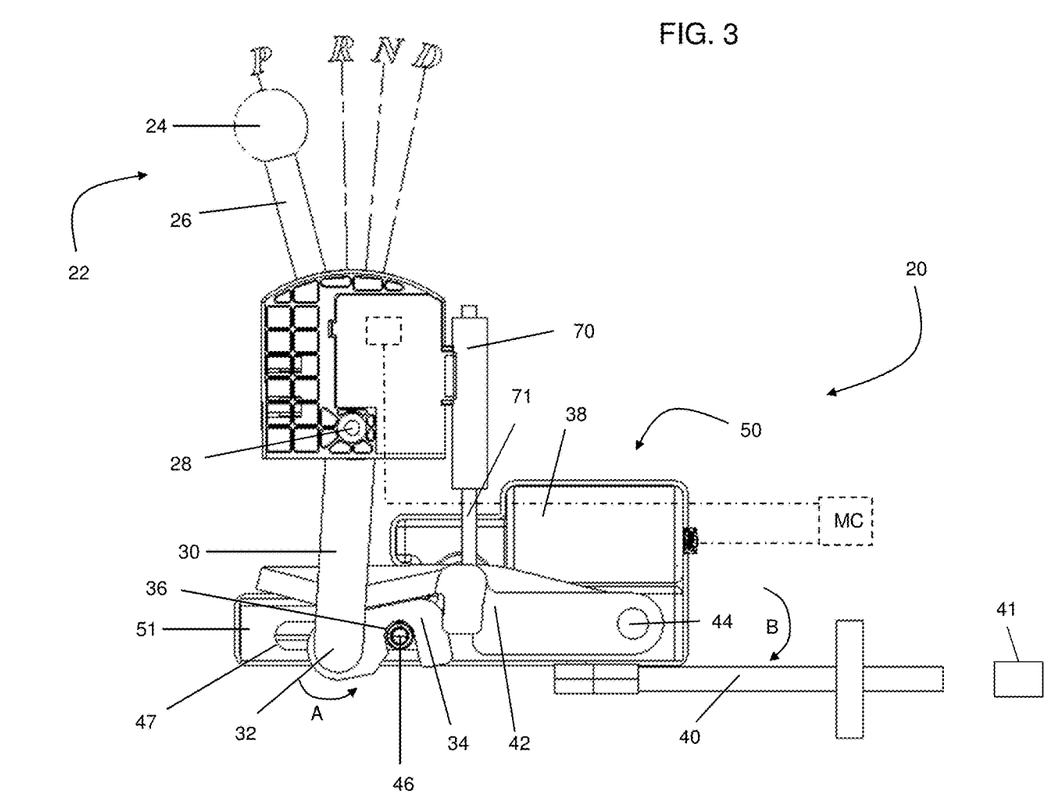
FIG. 3 is a side view of the exemplary automatic transmission shifter assembly in the manual engagement mode.
Figure 3A:
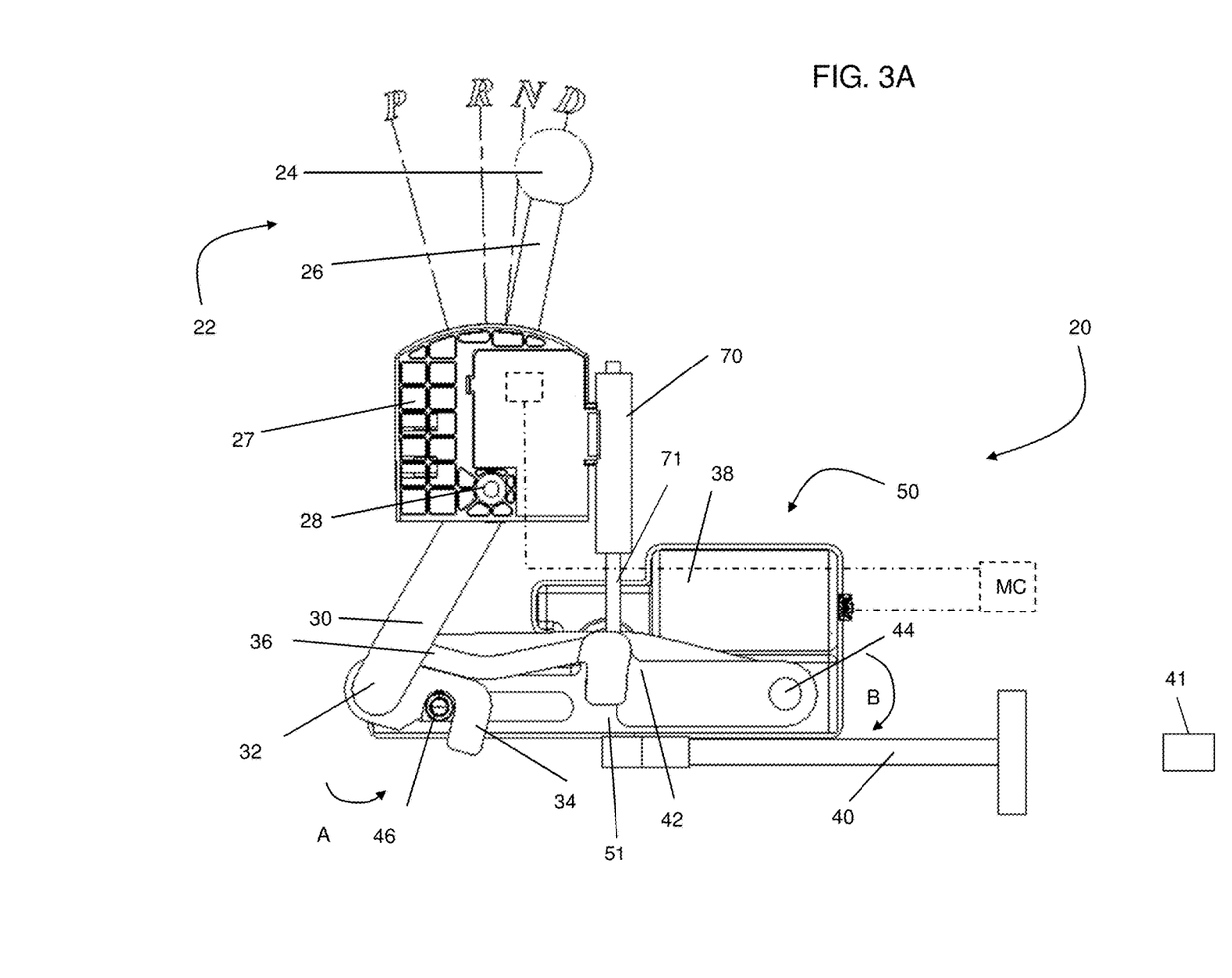
FIG. 3A is a side view illustrating movement of the exemplary automatic transmission shifter assembly in the manual engagement mode.
Figure 4:
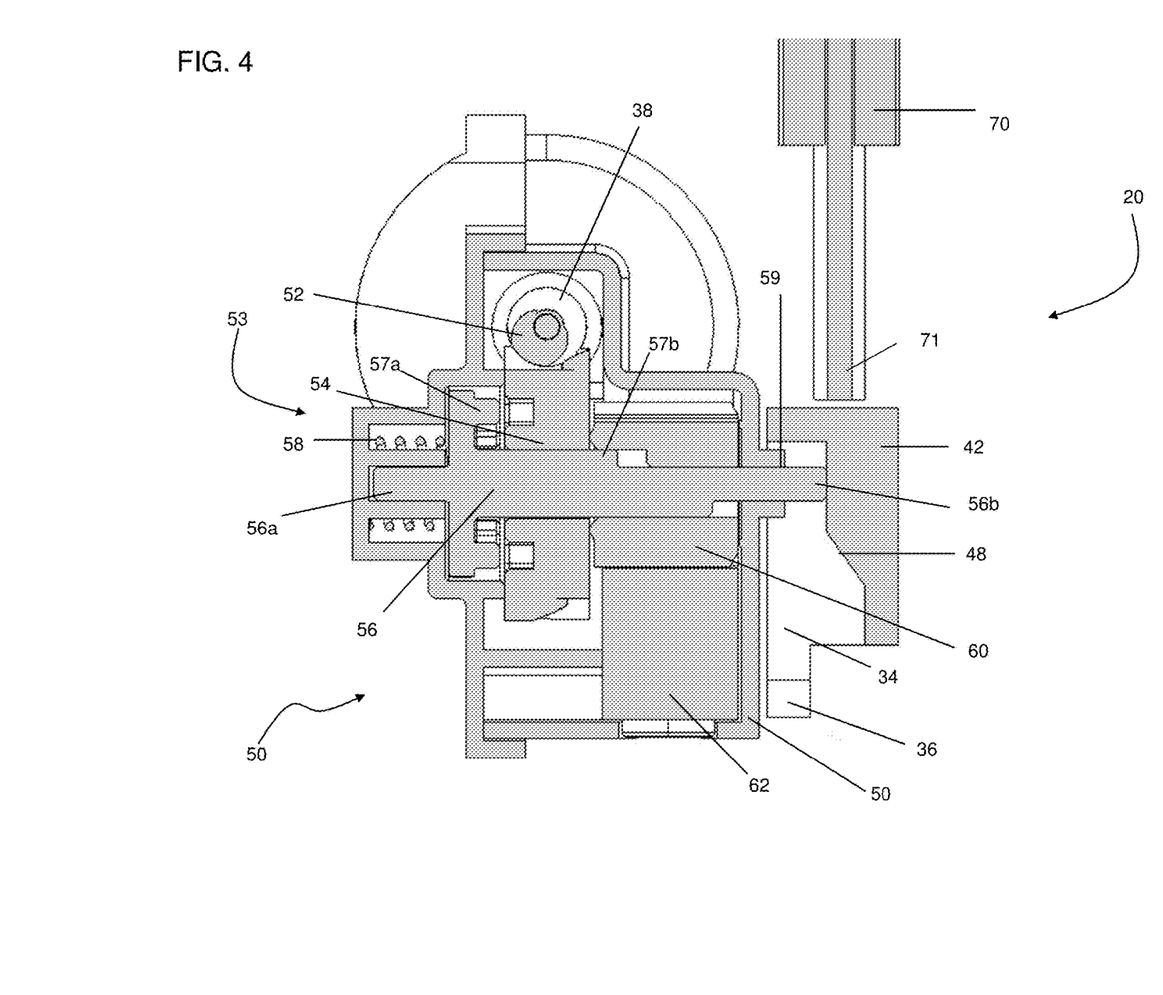
FIG. 4 is a cross-sectional view of the exemplary automatic transmission shifter assembly in the manual engagement mode.
Figure 5:
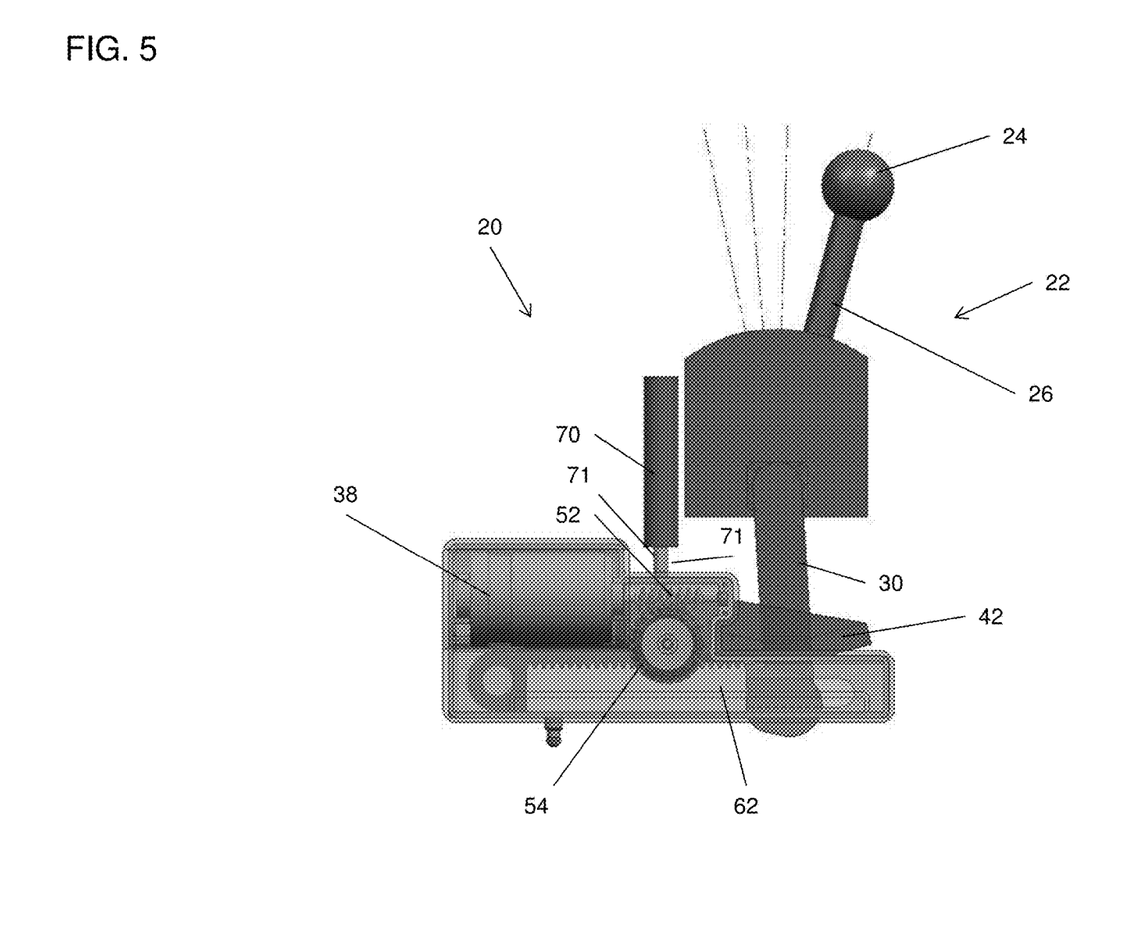
FIG. 5 is another side view of the shifter assembly wherein internal components are illustrated.
Figure 6:
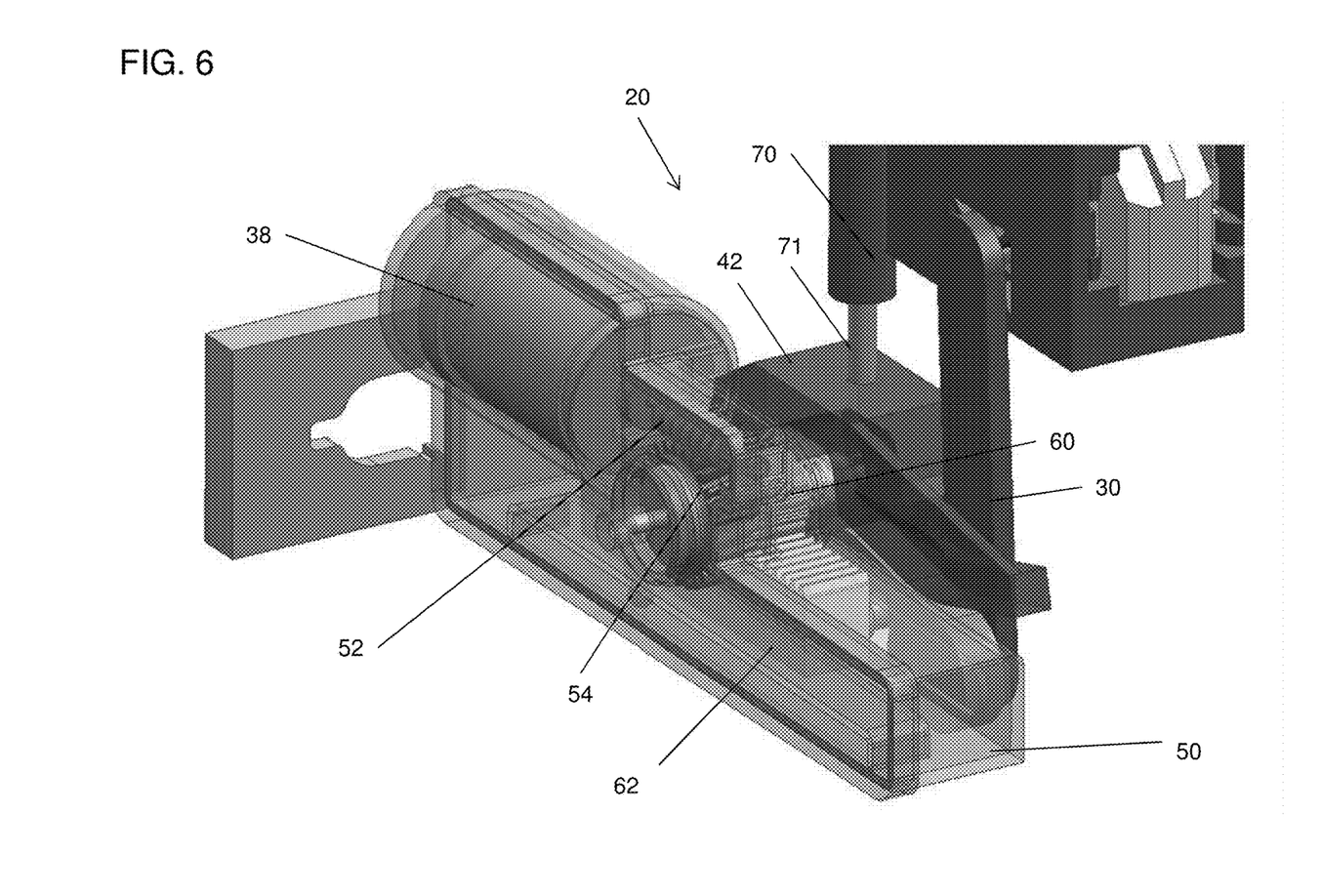
FIG. 6 is perspective view of the shifter assembly wherein internal components are illustrated.

Referring now to FIGS. 3, 3A and 4, the manual engagement device 70 has been activated, thereby decoupling the shifting medium 20 from the motor 38 for manual control. When activated, the manual engagement device 70 applies a force to the manual engagement link 42, causing the manual engagement link 42 to rotate from a first position to a second position. In the second position, the second end 56b of the clutch member 56 engages the cam surface 48 of the manual engagement link 42. The cam surface 48 applies a horizontal force in a direction opposite the biasing force of spring 58 such that the shoulders 57a, 57b of the clutch member 56 are disengaged from the second and third gears 54, 60. This movement of the clutch member 56 decouples the motor 38 from the movable component 62. Therefore, rotation of the manual engagement link 42 to a second position disengages the automatic control of the shifting medium 20. Movement of the shift lever 26 will not be impeded by the deactivated motor 38. The motor 38 may continue to operate upon receipt of input signals from the sensor (not shown), but this rotation will not transferred to the movable component 62.

Rotation of the manual engagement link 42 to a second position applies a rotational force on the manual engagement lever 34, such that the manual engagement lever 34 rotates against a biasing force, opposite the direction indicated by arrow A from a first position to a second position. As the manual engagement lever 34 rotates to a second position, the horizontal pin 46 fastened to the movable component 62 is captured within throat 36. This creates a direct connection between the shift lever 26 and the movable component 62. Movement of the shift lever 26 to a different position causes the connecting lever 30 and the manual engagement lever 34 to apply a force on pin 46 such that the movable component 62, and therefore the transmission cable 40, slides linearly along the base of the housing 50.

In one non-limiting embodiment and when the manual engagement button or device 70 is pushed down, it rotates the manual engagement link 42 down connecting the manual engagement lever 34 to the rack or movable component 62 that resides inside a housing 50 of the actuator 20 when this happens the manual engagement link 42 is also moving the clutch member 56, by means of the cam surface 48, compressing a spring 58 and disengaging the clutch member 56 from the helical gear 54 and motor 38 worm 52 interface. This action allows the rack 62, pinion or gear 60 and clutch member 56 to move independent of the motor 38, worm 52 and helical gear 54. In other words, the system has a power mode wherein the shift lever 26 is not directly or mechanically coupled to the cable 40 and ultimately the transmission and a manual mode, wherein the wherein the shift lever 26 is directly or mechanically coupled to the cable 40, via lever 30, engagement lever 34, pin 46, rack 62 and ultimately the transmission which will allow for shifting of the transmission or other component in the event of a power failure or failure of other components (e.g., motor, sensor, etc.) of the power mode apparatus.

As such, the power mode moves cable or device 40 via detection of the movement of lever 26 with a sensor that provides signals to a motor 38 to move the cable (no direct mechanical connection of lever 26 to cable or device 40) while the manual mode provides a direct mechanical connection of the shift lever 26 to the cable or device 40 so that its movement will move the cable or component 40 and in this manual mode the power operated device (e.g., motor 38, worm 52 and gear 54) are decoupled from the cable 40 such that it can be moved by movement of the shift lever 26.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manually controlling a system comprising:
    activating a manual engagement device;
    engaging a manual control to couple a first lever and a movable component;
    disengaging an automatic control coupling the first lever and the movable component, wherein the automatic control further comprises: a sensor for detecting a position of the first lever; a motor responsive to a signal from the sensor; and a coupling mechanism for transmitting rotation of the motor to the movable component; and
    moving the movable component by moving the first lever.

2. The method for manually controlling a system according to claim 1, wherein the manual engagement device is activated by applying a force.

3. The method for manually controlling a system according to claim 1, wherein the manual engagement device is a button.

4. A method for manually controlling a system comprising:
    activating a manual engagement device;
    engaging a manual control to couple a first lever and a movable component;
    disengaging an automatic control coupling the first lever and the movable component; and
    moving the movable component by moving the first lever, wherein the manual control further comprises:
    a connecting lever fastened to the first lever;
    a manual engagement lever rotatably coupled to an end of the connecting lever and movable between a first position and a second position, wherein the manual engagement lever is coupled to the movable component when in the second position; and
    a manual engagement link rotatable between a third position and a fourth position such that rotation of the manual engagement link to the fourth position, causes the rotation of the manual engagement lever to a second position.

5. The method for manually controlling a system according to claim 4, wherein activation of the manual engagement device rotates the manual engagement link to the fourth position.

6. The method for manually controlling a system according to claim 4, wherein the manual engagement link includes a cam surface such that when the manual engagement link rotates to the fourth position, the cam surface disengages the automatic system.

* * * * *